United States Patent Office 2,759,017
Patented Aug. 14, 1956

2,759,017

PREPARATION OF GUANIDINO TYPE COMPOUNDS

Bruno Vassel and Rose M. Kwapich, Toledo, Ohio, assignors to International Minerals & Chemical Corporation, a corporation of New York No Drawing. Application December 20, 1950,
Serial No. 201,857

9 Claims. (Cl. 260—534)

This invention relates to the preparation of guanidino substituted acids. More particularly, it relates to a method for the manufacture of alpha-guanidino substituted fatty acids, such as glycocyamine.

A number of processes are known whereby alpha-guanidino substituted fatty acids may be prepared. For example, glycocyamine has been prepared by heating guanidine carbonate with glycine at temperatures which will drive off water and carbon dioxide. Glycocyamine has been prepared by the reaction of glycine with cyanamide in the presence of ammonia. In still another method, glycocyamine is prepared by the reaction of free guanidine and haloacetic acid or ester.

The first reaction gives poor yields of glycocyamine, generally in the range of 25% to 40%. Maximum reported yields for the second reaction are 60% to 65%. Yields from the third reaction have been reported to be about 60%. A serious limitation of the third method is the difficulty in obtaining the reactant, free guanidine, in an almost water-free condition because the free base is quite unstable in aqueous solution, differing thus from its salts, such as guanidine hydrochloride which is readily available, and can be handled in solution without fear of decomposition.

It is an object of this invention to provide a process for the manufacture of alpha-guanidino substituted fatty acids which overcomes the limitations and disadvantages of the processes heretofore utilized.

It is a further object of the instant invention to provide a process giving high yields of alpha-guanidino substituted fatty acids.

It is a further object to provide a process wherein alpha-guanidino substituted fatty acids are produced from guanidine salts in liquid medium and from alpha-halo fatty acids.

It is a further object to provide a commercially feasible process whereby high yields of pure glycocyamine are obtained from a guanidine salt in liquid medium and chloroacetic acid.

These and other objects of the invention will become more apparent upon a fuller understanding of the invention as hereinafter described.

The process of the instant invention comprises reacting a guanidine salt in liquid medium with an alpha-halo fatty acid in the presence of an alkali metal hydroxide, and recovering alpha-guanidino substituted fatty acid from the reaction mixture.

In a specific embodiment of the instant invention, the process comprises adding a mixture containing a guanidine salt and an alkali metal hydroxide to an alpha-halo fatty acid, at a temperature of between about 0° and about 60° C., and agitating the resultant mixture while maintaining said temperature until the reaction is substantially complete.

In practicing one embodiment of the instant novel process, pellets of sodium hydroxide or potassium hydroxide, preferably potassium hydroxide, are added to a liquid medium containing a guanidine salt such as guanidine hydrochloride, guanidine sulfate, or guanidine nitrate. The resulting mixture is agitated for between about 0.5 and about 1.5 hours at a temperature of between about 5° and about 30° C., preferably at between about 15° and about 25° C. An alpha-halo fatty acid, for example, chloroacetic acid, is added to the cold mixture, and the temperature of the reaction mixture is maintained at between about 5° and about 30° C., preferably at between about 20° and about 25° C. during the addition of the halo fatty acid. The resulting mixture is agitated at between about 0° and about 60° C., preferably between about 35° and about 40° C., until the reaction is substantially complete, that is in about 6 to about 12 hours. The glycocyamine product is recovered from the reaction products.

The reaction may be carried out in any liquid medium. However, yields of alpha-guanidino substituted fatty acid can be increased by carrying out the reaction in a liquid medium in which the alkali metal hydroxide which is employed is substantially insoluble. When the reaction is carried out in, for example, water in which the alkali metal hydroxide is soluble, yields of glycocyamine are lower than when carried out in acetone, ether, methylene chloride, or other liquid mediums in which the alkali metal hydroxide is substantially insoluble unless an excess of the alkali metal hydroxide is employed.

In practicing the instant invention, preferably a solvent such as acetone, ether, or methylene chloride, is employed. The glycocyamine and the salt of the alkali metal hydroxide, which are the solid constituents of the reaction products, may be separated from one another by leaching the solids with a liquid in which one of the constituents is substantially soluble and in which the other is substantially insoluble. For example, when potassium hydroxide is employed as the alkali metal hydroxide, the solid constituents of the reaction products comprise glycocyamine and potassium chloride. When water, 50% methanol, or similar solvents are added to the mixture, potassium chloride dissolves, and the residue which is separated from the solution is pure glycocyamine.

The instant novel process is carried out by preparing a mixture comprising a guanidine salt and an alkali metal hydroxide in liquid medium. The guanidine salt is preferably guanidine hydrochloride; however, the nitrate, the sulfate, or the guanidine carbonate which has been treated with sulfuric acid or with hydrochloric acid, may also be used. Examples of alkali metal hydroxides which may be employed are potassium hydroxide and sodium hydroxide. Potassium hydroxide is preferred when guanidine hydrochloride is the salt employed because the resulting potassium chloride can easily be separated from the alpha-guanidino substituted fatty acid, such as glycocyamine, by leaching with a 50% methanol solution.

All of the alpha-halo fatty acids are useful for the purposes of the instant invention. For example, chloroacetic acid, alpha-chloropropionic acid, alpha-bromoacetic acid, and the like, may be employed.

In practicing another embodiment of the instant process, a liquid medium, such as acetone, and which contains between about 0.25 and about 1.0 mole of a guanidine salt of a monobasic acid, or between about 0.125 and about 0.5 mole of a guanidine salt of a dibasic acid, and between about 0.50 and about 2.0 moles of the alkali metal hydroxide, is agitated at a temperature of between about 5° and about 35° C. for between about 0.5 and about 1.5 hours. Between about 15° and about 25° C. is the preferred temperature range; however, higher or lower temperatures may be used. Between about 0.25 and about 1.0 mole of the alpha-halo fatty acid, such as chloroacetic acid, is added to the resulting mixture, and the temperature during the addition is controlled so that it does not rise above about 30° C. The temperature is preferably maintained at between about 20° and about 25° C. The reaction mixture is then agitated for at least about 6 hours at a temperature of between about 5° and about 60° C., preferably at between about 35° and about 40° C. The solid constituents in the reaction products are separated from the solvent which can be used again. The solids which are separated from the solvent comprise the salt of the alkali metal hydroxide and the alpha-guanidino substituted fatty acid and are leached at room temperature with a solvent, such as water, a water-methanol mixture, or other solvent or combination of solvents, in which one of the solid constituents is substantially soluble and in which the other is substantially insoluble. Preferably, a solvent is used in which the guanidino substituted fatty acid is insoluble. In such case, pure guanidino substituted fatty acid is separated from the solvent and is washed with water and dried.

In another embodiment of the instant invention guanidine sulfate is used as the guanidine salt. For example, between about 0.25 and about 1.0 mole of guanidine carbonate is suspended in a solvent such as ether. To the mixture is added between about 0.25 and about 1.0 mole of sulfuric acid, and the resulting mixture is agitated until the evolution of carbon dioxide ceases. Between about 1.0 and about 4.0 moles of sodium hydroxide pellets is added and the resulting mixture is agitated at between about 15° and about 25° C. for about 1 hour. Between about 0.25 and about 1.0 mole of chloroacetic acid is slowly added to the resulting mixture. The temperature of the mixture is maintained at between about 20° and about 25° C. during the chloroacetic acid addition. It is then raised to between about 35° and about 40° C. for the reaction period of at least about 6 hours and preferably between about 8 and about 12 hours. After the reaction has proceeded to substantial completion, the resulting mixture is filtered. Glycocyamine is recovered from the filter cake as above described.

In a preferred embodiment of the instant novel process, about 1.0 mole of guanidine hydrochloride and about 2.0 moles of potassium hydroxide pellets are added to between about 600 and about 800 cc. of acetone, and the resulting mixture is agitated at between about 15° and about 25° C. for about 1 hour. About 1.0 mole of chloroacetic acid is slowly added to the resulting mixture. The temperature of the mixture is maintained at between about 20° and about 25° C. during the chloroacetic acid addition. It is then raised to between about 35° and about 40° C. for the reaction period of at least about 6 hours and preferably between about 8 and about 12 hours. After the reaction has proceeded to substantial completion, the resulting mixture is filtered. The resulting precipitate of potassium chloride and glycocyamine is treated with sufficient 50% methanol to dissolve the potassium chloride. The glycocyamine, which is insoluble in aqueous methanol solution, is washed and dried. The product is pure glycocyamine.

By this method, glycocyamine, alpha-guanidino propionic acid, alpha-guanidino-n-butyric acid, and the like, may be prepared. Such compounds have utility as pharmaceuticals, alone or in combination with other compounds.

The invention will be further understood from a study of the following examples illustrating some of the practices of the present invention, but it is to be understood that the following examples are illustrative only and that there is no intention to limit the invention thereto.

*Example I*

About 47.7 grams of guanidine hydrochloride in 400 cc. of acetone is mixed with about 56 grams of potassium hydroxide pellets for about 1 hour at about 20° C. About 47.25 grams of solid chloroacetic acid is added to the acetone mixture, and the temperature is maintained at about 25° C. during the addition of the chloroacetic acid. The reaction mixture is agitated for about 8 hours at a temperature of between about 35° and about 40° C. The reaction products are filtered, and 350 cc. of about 50% methanol is added to the filter cake. Potassium chloride dissolves in the methanol and pure glycocyamine is recovered in about 60% yield.

*Example II*

About 61 grams of guanidine nitrate in 400 cc. of methylene chloride is mixed with about 40 grams of sodium hydroxide pellets for about 1 hour at about 20° C. About 47.25 grams of solid chloroacetic acid is added to the methylene chloride mixture, and the temperature is maintained at about 25° C. during the addition of the chloroacetic acid. The reaction mixture is agitated for about 8 hours at reflux temperature (40–43° C.). The reaction products are filtered and washed twice; once with 150 cc., and then with 100 cc. of water at room temperature. Pure glycocyamine is recovered in about 60% yield.

*Example III*

About 45 grams of guanidine carbonate is suspended in 400 cc. of ethyl ether. To it is added slowly with stirring 24.5 grams of sulfuric acid of 1.84 specific gravity. Stirring is continued until the evolution of carbon dioxide ceases, when 40 grams of sodium hydroxide pellets are added slowly, maintaining the temperature at about 20° C. during the addition, and continuing the stirring for about 1 hour. About 47.25 grams of solid chloroacetic acid is added to the ether solution, and the temperature maintained at reflux (about 35° C.) for about 8 hours. The reaction products are filtered and the filter cake is washed twice with 200 cc. and then with 150 cc. portions of water to remove the salts. Pure glycocyamine is recovered in about 65% yield.

*Example IV*

About 45 grams of guanidine carbonate is added to about 400 cc. of water, and to it is slowly added with stirring about 400 grams of hydrochloric acid of 1.1878 specific gravity. Stirring is continued until the evolution of carbon dioxide ceases, then about 40 grams of sodium hydroxide pellets is added slowly to the mixture. The resulting mixture is stirred at about 20° C. for about 1 hour. About 47.27 grams of solid chloroacetic acid is added to the resulting solution and the temperature is maintained at about 25° C. during the addition of the acid. The resulting reaction mixture is then agitated at between about 35° and about 40° C. for about 8 hours. The reaction products are filtered, and the solid glycocyamine washed with water. Pure glycocyamine is recovered in about 50% yield.

Having thus fully described and illustrated the character of the invention, what is desired to be secured and claimed by Letters Patent is:

1. A process for the preparation of guanidino type compounds which comprises reacting a mixture containing an alkali metal hydroxide in an amount at least in molar excess over that required to neutralize the acid portion of the guanidine salt selected from the group consisting of sodium hydroxide and potassium hydroxide and a guanidine salt in an inert organic liquid medium in which the alkali metal hydroxide is substantially insoluble with an alpha-halo fatty acid selected from the group consisting of alpha-chloro and alpha-bromo fatty acids, at a temperature between about 0° C. and about 60° C. and recovering guanidino substituted fatty acid from the reaction products.

2. A process for the preparation of guanidino substituted fatty acids which comprises preparing a mixture of a guanidine salt selected from the group consisting of guanidine hydrochloride, guanidine nitrate and guanidine sulfate and an alkali metal hydroxide in an amount at least in molar excess over that required to neutralize the acid portion of the guanidine salt selected from the group consisting of sodium hydroxide and potassium hydroxide in an inert organic liquid medium in which the alkali metal hydroxide is substantially insoluble, mixing an alpha-halo fatty acid selected from the group consisting of alpha-chloro and alpha-bromo fatty acids, at a temperature between about 0° C. and about 60° C. with said mixture, agitating the resulting mixture until the reaction has proceeded to substantial completion, and recovering alpha-guanidino substituted fatty acid from the reaction products.

3. A process for the preparation of guanidino substituted fatty acids which comprises preparing a mixture of a guanidine salt and an alkali metal hydroxide in an amount at least in molar excess over that required to neutralize the acid portion of the guanidine salt in an inert organic liquid medium in which the alkali metal hydroxide is substantially insoluble, agitating said mixture for between about ½ and about 1½ hours at a temperature of between about 5° and about 30° C., adding an alpha-halo fatty acid selected from the group consisting of alpha-chloro and alpha-bromo fatty acids to the resultant mixture while maintaining the temperature at between about 5° and about 30° C., agitating the resulting mixture at a temperature of between about 0° and about 60° C. for at least about 6 hours, and recovering alpha-guanidino substituted fatty acid from the reaction products.

4. A process for the preparation of guanidino substituted fatty acids which comprises preparing a mixture of a guanidine salt selected from the group consisting of guanidine hydrochloride, guanidine sulfate and guanidine nitrate and an alkali metal hydroxide in an amount at least in molar excess over that required to neutralize the acid portion of the guanidine salt selected from the group consisting of sodium hydroxide and potassium hydroxide in an inert organic liquid medium in which the alkali metal hydroxide is substantially insoluble, agitating said mixture for between about ½ and 1½ hours at a temperature of between about 5° and about 30° C., adding chloroacetic acid to the resultant mixture while maintaining the temperature at between about 20° and about 25° C., agitating the resulting mixture at a temperature of between about 5° and about 60° C. for at least about 6 hours, and recovering glycocyamine from the reaction products.

5. A process for the preparation of guanidino substituted fatty acids which comprises preparing a mixture of a guanidine salt selected from the group consisting of guanidine hydrochloride, guanidine nitrate and guanidine sulfate and an alkali metal hydroxide in an amount at least in molar excess over that required to neutralize the acid portion of the guanidine salt selected from the group consisting of potassium hydroxide and sodium hydroxide in an inert organic liquid medium in which the alkali metal hydroxide is substantially insoluble, agitating the resulting mixture for between about ½ and about 1½ hours at a temperature of between about 5° and about 30° C., adding an alpha-halo fatty acid selected from the group consisting of alpha-chloro and alpha-bromo fatty acids, to the resulting suspension while maintaining the temperature at between about 20° and about 25° C., agitating the resulting mixture at a temperature of between about 5° and about 60° for at least about 6 hours, and recovering guanidino substituted fatty acid from the reaction mixture.

6. A process for the preparation of glycocyamine which comprises adding chloroacetic acid to a mixture prepared by mixing at a temperature between about 5° and about 30° C. an alkali metal hydroxide in an amount at least in molar excess over that required to neutralize the acid portion of the guanidine salt and a guanidine salt suspended in an inert organic liquid medium in which the alkali metal hydroxide is substantially insoluble, maintaining the temperature of the resulting mixture at between about 5° and about 30° C. during the addition of the acid, agitating the resultant mixture at a temperature of between about 5° and about 60° C. for at least about 6 hours, and separating glycocyamine therefrom.

7. A process for the preparation of glycocyamine which comprises adding chloroacetic acid to a mixture prepared by mixing at a temperature of between about 20° and about 25° C. for between about ½ and 1½ hours an alkali metal hydroxide selected from the group consisting of sodium hydroxide and potassium hydroxide and guanidine hydrochloride suspended in an inert organic liquid medium in which the alkali metal hydroxide is substantially insoluble in quantity to produce a mole ratio of chloroacetic acid to guanidine hydrochloride to hydroxide of about 1:1:2, maintaining the temperature of the resulting mixture at between about 15° and about 25° C. during the addition of the acid, agitating the resultant mixture at a temperature of between about 35° and about 40° C. for at least about 6 hours, and separating glycocyamine therefrom.

8. A process for the preparation of glycocyamine which comprises adding chloroacetic acid to a mixture prepared by mixing at a temperature of between about 20° and about 25° C. for between about ½ and 1½ hours an alkali metal hydroxide selected from the group consisting of sodium hydroxide and potassium hydroxide and guanidine sulfate suspended in an inert organic liquid medium in which the alkali metal hydroxide is substantially insoluble in quantity to produce a mole ratio of chloroacetic acid to guanidine sulfate to hydroxide of about 2:1:4, maintaining the temperature of the resulting mixture at between about 15° and about 25° C. during the addition of the acid, agitating the resultant mixture at a temperature of between about 35° and about 40° C. for at least about 6 hours, and separating glycocyamine therefrom.

9. A process for the preparation of glycocyamine which comprises mixing at a temperature of between about 15° and about 25° C. between about 0.25 and about 1.0 mole of chloroacetic acid and a mixture prepared by mixing at a temperature of between about 20° and about 25° C. for between about ½ and about 1½ hours between about 0.5 and about 2.0 moles of an alkali metal hydroxide selected from the group consisting of sodium hydroxide and potassium hydroxide and guanidine hydrochloride suspended in an inert liquid medium selected from the group consisting of acetone, ether, and methylene chloride, agitating the resultant mixture at a temperature of between about 35° and about 40° C. for at least about 6 hours, and separating glycocyamine therefrom.

References Cited in the file of this patent

UNITED STATES PATENTS

| | | |
|---|---|---|
| 1,967,400 | Fischl | July 24, 1934 |
| 2,225,155 | Cheronis | Dec. 17, 1940 |
| 2,316,636 | Teeters | Apr. 13, 1943 |

OTHER REFERENCES

Ramsay: Ber. Deut. Chem., vol. 41, pp. 4385–93 (1908).

Ramsay: Ber. Deut. Chem., vol. 42, pp. 1137–39 (1909).

Abderhalden et al.: Chem. Abstracts, vol. 22, p. 1330 (1928).

King: J. Chem. Soc. (London), vol. 1930, pp. 2374–7.

Mourgue: Chem. Abstracts, vol. 42, Col. 4533 (1948).